March 24, 1931. F. M. WILLIAMS ET AL 1,797,562
FLOOR MAT
Filed March 11, 1930

Inventors
Francis M. Williams,
Earl W. Coble,
By Owen & Owen,
Attorneys

Patented Mar. 24, 1931

1,797,562

UNITED STATES PATENT OFFICE

FRANCIS M. WILLIAMS AND EARL W. COBLE, OF TOLEDO, OHIO

FLOOR MAT

Application filed March 11, 1930. Serial No. 434,907.

This invention relates to a floor mat of the type which is composed largely of rubber or similar material, and has been devised primarily with the object of producing, at a moderate cost, a mat which will have a high degree of resiliency, which will serve as an efficient and sanitary means for protecting the floor, and which may be easily cleaned.

According to the invention as herein disclosed, the mat is made up of numerous links, of rubber or similar material, connected by pivot members and arranged with spaces therebetween. The various links are provided with ribs or ridges adapted to support a person walking thereon and spaces also are provided about the pivot members and elsewhere to increase the cushioning effect naturally resulting from the compressibility of the rubber itself.

The specific construction of the invention, in its present embodiment, and the advantages resulting therefrom will be more particularly explained in connection with the accompanying drawings which illustrate the same in detail.

Figure 1:
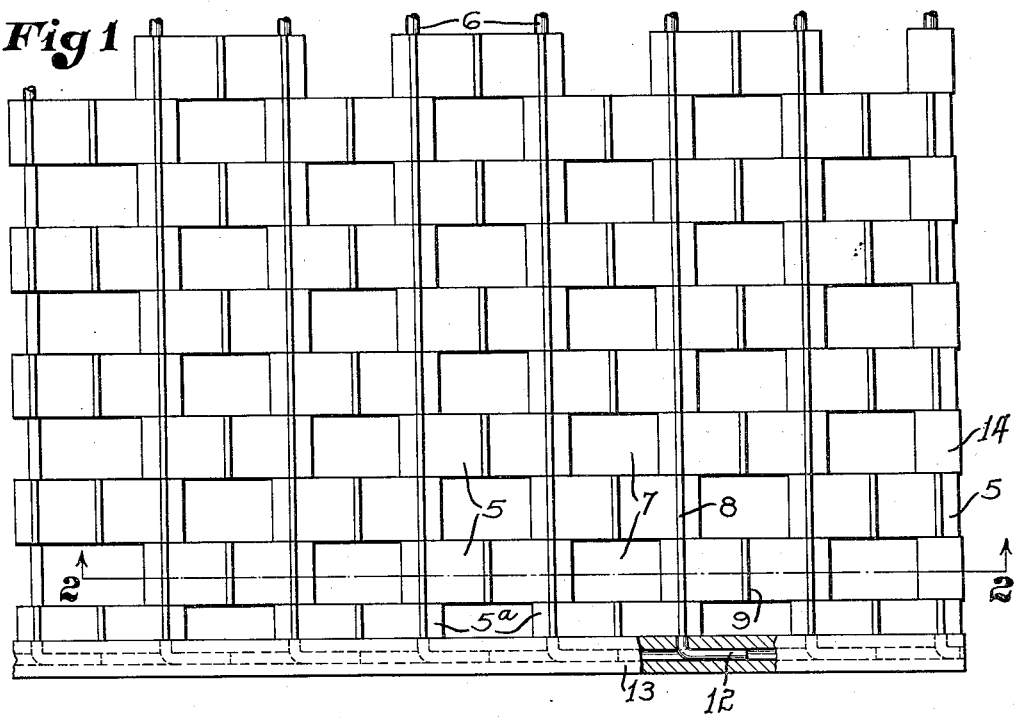
Figure 1 is a plan view of a portion of the mat constructed according to the invention.
Figure 2:
Fig. 2 is a cross-section taken on the line 2—2 of Fig. 1.
Figure 3:
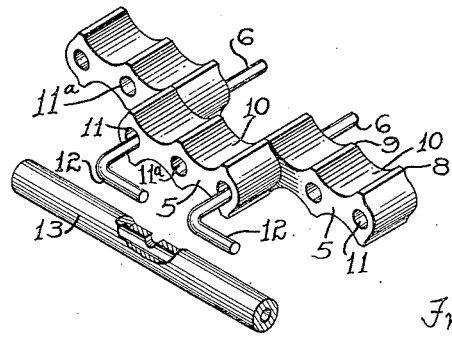
Fig. 3 is an isometric view illustrating in detail the construction of the links and pivot members.

As shown in the drawings, the mat comprises series of links 5 preferably composed of rubber, arranged in rows in staggered relation and connected by metallic pivot members 6 so as to leave spaces 7 between the links. Each link is formed at each end with vertically projecting ribs or ridges 8 and is formed midway between its ends with ridges 9 of a similar nature, thus leaving concave portions or grooves 10 between the ridges. The link is formed at each end midway between the ridges 8 with a hole 11 constituting a bearing for the pivot member 6. The diameter of this hole is appreciably more than the diameter of the member 6, so that when pressure is applied to the mat, as by a person walking thereon, the bearing portions of the links may be flattened, thus making the mat more resilient than would result from the compressibility of the rubber alone. This resiliency is also aided by making the ridges 9 of slightly less depth than the ridges 8, permitting the link to yield appreciably before the ridge 9 on the underside touches the floor. Resiliency of a link is also facilitated by providing a hole 11$^a$ through the central portion of the link between the ridges 9.

Each pivot member 6 has its end portions, which extend without the outermost row of links 5 at each side edge of the mat, angled lengthwise of the respective edge as shown at 12, and encased in an edge binding strip 13 of tubular rubber. One side of each strip is perforated at proper intervals for the pivot members to project through and the angled end portions 12 lie within the hollows of the strips. The links adjacent these ends 12 may be made narrower than the other links, as indicated at 5$^a$ in Fig. 1. At each end of the mat, the links are spaced by collars 14.

From the foregoing description, it will be seen that we have provided a floor mat which is of simple and economical construction and which will afford a complete protection for the floor. The ridges afford efficient means for wiping a person's feet, and the over size holes 11 in connection with the reduced thickness of the intermediate portions of the links, including the ridges 9 of less height than the ridges 8, and the holes 11$^a$ make the surface of the mat very resilient.

The links 5 are preferably made from extruded rubber, and reclaimed rubber may be used for this purpose, without detracting materially from the quality of the product or greatly lessening its durability. The pivot members may be made from 14 gauge wire with good results.

It is found in practice that a mat embodying our invention automatically acts to clean the soles of shoes worn by persons walking thereover, inasmuch as when pressure is brought to bear on the links, a lateral creeping action is imparted to the ridges of the link links, due to the resiliency of the link material, thus causing the ridges to have a wiping action on the soles of shoes bearing downward thereon, even though no scraping movement is imparted to the soles when on the mat. It is also found that this form of mat is particularly valuable for use as a mat for electricians to stand on when desiring to be insulated against the grounding of an electrical circuit through the body. The insulating action is aided by the provision of the ridges on the links, which provide space points of contact of the links with a grounding surface, and also enable the free circulation of air around the links.

While we have shown and described specifically one embodiment of the invention, it is to be understood that this is merely for the purpose of illustration and that various modifications may be made therein without departing materially from the scope of the invention as claimed.

What we claim is:

1. In a floor mat, the combination of series of links composed of yieldable material and pivot members connecting said links, said links having holes forming bearings for the pivot members, said holes being of larger diameter than the pivot members, so that the bearing portions of the links may be easily flattened under pressure.

2. In a floor mat, the combination of series of links composed of yieldable material and pivot members connecting said links, said links having holes forming bearings for the pivot members, the portions of said links between the bearings being thinner than the bearing portions and normally spaced from the floor so as to offer less resistance when pressure is applied to the mat.

3. In a floor mat, the combination of series of links composed of yieldable material and pivot members connecting said links, said links having holes forming bearings for the pivot members, said holes being of greater diameter than the pivot members, so that the bearing portions of the links may be easily flattened by pressure, the portions of said links between the bearings being normally spaced from the floor so as to offer less resistance when pressure is applied to the mat.

4. In a floor mat, the combination of series of links composed of yieldable material, pivot members connecting said links, said links having holes forming bearings for the pivot members, said holes being of greater diameter than the pivot members, and ribs projecting vertically from the exterior of the bearing portions of said links directly above and below the holes.

5. In a floor mat, the combination of series of links composed of yieldable material, pivot members connecting said links, said links having holes forming bearings for the pivot members, said holes being of greater diameter than the pivot members, and ribs projecting vertically from the exterior of the bearing portions of said links directly above and below the holes, the portions of the links between the bearings being formed with ribs of less height than the first mentioned ribs.

6. In a floor mat, a plurality of links and pivot members connecting the same, each link being formed of extruded rubber and having a hole at each end extending horizontally from one side edge to the other for receiving the pivot member, the vertical thickness of said link measured through said holes being greater than the vertical thickness at any other point.

7. In a floor mat, a plurality of links and pivot members connecting the same, each link being formed of soft rubber and having a hole at each end extending horizontally from one side edge to the other for receiving the pivot member, the top and bottom surfaces of said link being formed with transverse ribs, with grooves therebetween.

8. In a floor mat, a plurality of links and pivot members connecting the same, each link being formed of soft rubber and having a hole at each end extending horizontally from one side edge to the other for receiving the pivot member, each of the top and bottom surfaces of said link being formed with a rib opposite each of said holes and an intermediate rib parallel to the first mentioned ribs and separated therefrom by grooves.

9. In a floor mat, a plurality of links of resilient material each having spaced ridges projecting from one side thereof.

10. In a floor mat, a plurality of links of resilient material each having a plurality of pairs of opposed ridges on the top and bottom surfaces thereof.

11. In a floor mat, a plurality of links of resilient material material each having a plurality of pairs of opposed ridges on the top and bottom surfaces thereof, and holes in the pressure lines of the ridges to increase the resiliency of the links.

12. In a floor mat, a plurality of links of resilient material each having a plurality of pairs of opposed ridges on the top and bottom surfaces thereof, and a hole between each pair of ridges to increase the resiliency of the link.

13. In a floor mat, the combination of series of links composed of yieldable material and pivot members connecting said links, each link having holes in its ends forming bearings for the pivot members, said holes being of greater diameter than the pivot members so that the bearing portions of the links may be easily flattened under pressure, each link also having one or more holes extending therethrough intermediate the first holes so as to offer less resistance to pressure upon the mat.

14. In a floor mat, the combination of series of links composed of yieldable material and pivot members connecting said links, each link having holes in its ends forming bearings for the pivot members, said holes being of greater diameter than the pivot member, so that the bearing portions of the links may be easily flattened under pressure, each link also having one or more holes extending from side to side thereof intermediate the bearing holes.

15. In a floor mat, a plurality of link members, pivot members connecting the ends of adjacent link members, an end of each pivot member at the same edge of the mat being angled and lying lengthwise of the edge, and a member encasing the angled ends of the pivot member and extending lengthwise of said edge for substantially the length of the mat, said encasing member having side openings through which the pivot members extend.

16. In a floor mat, a plurality of link members, pivot members connecting the ends of adjacent link members, an end of each pivot member at the same edge of the mat being angled and lying lengthwise of the edge, and a pliant member encasing the angled ends of the pivot members and extending lengthwise of said edge for substantially the length of the mat, said member having side openings through which the pivot members extend.

17. In a floor mat, a plurality of link members, pivot members connecting the ends of adjacent link members, an end of each pivot member at the same edge of the mat being angled and lying lengthwise of the edge, and a tubular member of soft rubber extending lengthwise of said edge for substantially the length of the mat and having side openings through which the angled ends of the pivot members are threaded into the lengthwise extending opening of the tubular member whereby the ends of the link members are entirely encased by the tubular member.

18. In a floor mat, a plurality of links, pivot members connecting adjacent links and an edge-binding strip of flexible resilient material forming a common anchorage for the adjacent ends of the pivot members and substantially co-extensive in length with the associated edge.

19. In a floor mat, a plurality of links, crossed pivot members for the links projecting beyond the links at the side edges of the mat, and a flexible side edge-binding member receiving and forming an anchorage for the adjacent ends of the pivot members and substantially co-extensive in length with the associated edge of the mat.

20. In a floor mat, a plurality of links of resilient material having a plurality of pairs of opposed ridges on the tread surfaces thereof and being relatively thin between the pairs of ridges to facilitate flexing of the links when pressure is applied to the ridges.

In testimony whereof we have hereunto signed our names to this specification.

FRANCIS M. WILLIAMS.
EARL W. COBLE.